United States Patent
Underwood et al.

[11] Patent Number: 6,065,153
[45] Date of Patent: *May 23, 2000

[54] WATER RESISTANT PROTECTIVE GARMENT FOR FIRE FIGHTERS

[76] Inventors: Joey K. Underwood, 106 River Forest La., Greenville, S.C. 29615; T. Doyle Kelley, 1623 E. Saluda Lake Rd., Greenville, S.C. 29611

[*] Notice: This patent issued on a continued prosecution application filed under 37 CFR 1.53(d), and is subject to the twenty year patent term provisions of 35 U.S.C. 154(a)(2).

[21] Appl. No.: 09/016,097

[22] Filed: Jan. 30, 1998

[51] Int. Cl.$^7$ .............................. A41D 1/00; C14C 9/00; B32B 7/00
[52] U.S. Cl. .................................. 2/93; 427/2; 427/171; 428/246; 525/420; 525/104; 252/8.57
[58] Field of Search ............................ 2/82, 87, 93, 97; 428/694, 296.7, 246; 427/501, 27, 513, 557, 314, 366, 370, 171; 442/107, 226, 19, 43, 79, 80, 82; 525/420, 104; 252/8.57

[56] References Cited

U.S. PATENT DOCUMENTS

| | | |
|---|---|---|
| 3,068,187 | 12/1962 | Bolstad et al. . |
| 3,252,932 | 5/1966 | Bolstad et al. . |
| 3,329,661 | 7/1967 | Smith et al. . |
| 3,330,812 | 7/1967 | Smith et al. . |
| 3,356,628 | 12/1967 | Smith et al. . |
| 3,476,583 | 11/1969 | Elkind et al. . |
| 4,483,900 | 11/1984 | Goldfarb . |
| 4,965,408 | 10/1990 | Chapman et al. . |
| 5,024,851 | 6/1991 | Goad et al. .................... 427/2 |
| 5,026,591 | 6/1991 | Henn et al. . |
| 5,187,005 | 2/1993 | Stahle et al. . |
| 5,258,458 | 11/1993 | Allewart et al. .................. 525/104 |
| 5,310,824 | 5/1994 | Burch et al. ..................... 525/420 |
| 5,514,459 | 5/1996 | Blauer et al. .................... 428/246 |
| 5,536,304 | 7/1996 | Coppens et al. ................. 252/8.57 |
| 5,594,061 | 1/1997 | Sharma et al. . |
| 5,630,846 | 5/1997 | Hara et al. . |
| 5,674,951 | 10/1997 | Hargis et al. . |
| 5,721,309 | 2/1998 | Sharma et al. . |
| 5,843,851 | 12/1998 | Cochran . |
| 5,876,792 | 3/1999 | Caldwell ........................ 427/171 |

*Primary Examiner*—John J. Calvert
*Assistant Examiner*—Robert Muromoto, Jr.
*Attorney, Agent, or Firm*—Dority & Manning, P.A.

[57] ABSTRACT

A protective garment of the type typically worn by fire fighters with improved water resistance is disclosed. In particular, the present invention is directed to an outer shell material for protective garments that is made from a fire resistant material coated with a durable water resistant coating. The durable water resistant coating is applied to the outer shell in a manner so that the coating will not degrade when exposed to normal wear and tear and even after the garment has been laundered repeatedly. Protective garments constructed in the past typically lost most of their water repellency after being laundered as little as five cycles. It has been discovered that water resistant coatings applied according to the process of the present invention, on the other hand, can survive at least 30 laundry cycles, and in many applications at least 50 laundry cycles without significantly degrading.

27 Claims, 3 Drawing Sheets

100
No sticking or wetting of upper surface

90
Slight random sticking or wetting of upper surface

80
Wetting of upper surface at spray points

70
Partial wetting of whole of upper surface only

50
Complete wetting of whole of upper surface only

0
Complete wetting of whole of upper and lower surfaces

WATER RESISTANT PROTECTIVE GARMENT FOR FIRE FIGHTERS

FIELD OF THE INVENTION

The present invention generally relates to protective garments such as the type worn by fire fighters. More particularly, the present invention is directed to a protective garment having a water resistant outer shell. In particular, an outer shell made according to the present invention has proven to be able to retain its primary water resistant properties even after undergoing 30 laundry cycles.

BACKGROUND OF THE INVENTION

Protective garments worn by fire fighters are designed to perform several functions. Of these, protection from heat and flame are perhaps the most important characteristics of the garments. In addition to providing protection from heat and flame, the garments, however, should be as light as possible, should provide some breathability and should encumber the wearer as little as possible.

Conventional fire fighter garments are generally constructed having a number of discrete layers. Typically, these layers include an outer shell, a moisture barrier layer, a thermal barrier layer, and an inner lining. The layers are generally made from appropriate thermally-resistant materials to provide protection against heat and flame.

In the past, one difficulty that has been encountered in designing protective garments to be worn by fire fighters is to prevent the garments from absorbing and retaining moisture. For instance, protective garments worn by fire fighters usually become wet during use due to external exposure to extinguishing water or rain. Also, fire fighter garments can become wet due to the absorption of perspiration given off by the wearer. Unfortunately, when the protective garment absorbs moisture, the characteristics and properties of the garment can be adversely affected. For example, when retaining moisture, the protective garment can become significantly heavier.

Besides increasing in weight, the presence of moisture within a protective garment also adversely affects the thermal properties of the garment making the garment less effective in shielding its wearer from thermal heat. In particular, since water is a much better heat conductor than air, the rate of heat transfer through the garment increases. Also, it has been discovered that as water heats up in a protective garment, the water can turn to steam under exposure to heat and actually burn a person wearing the garment.

Ultimately, when protective garments as described above become wet or soaked with water or other fluids, the garments become hot and uncomfortable to work in due to the increased weight and due to the increased rate of heat transfer through the garment. As a consequence, a wearer can only spend a limited amount of time working or performing tasks in the garment due to the possibility of heat stress.

In the past, in order to prevent water from being absorbed by protective garments worn by firemen, the garments have been treated with a water resistant composition. The water resistant treatments applied to conventionally made protective garments, however, have not proven to be durable and have been found to become ineffective after the garment has been placed in use for a period of time. In particular, it has been discovered that conventionally applied water resistant treatments become significantly degraded when the protective garment is washed. Specifically, it has been found that the water resistant treatments begin to degrade only after five (5) laundry cycles and typically lose most of their effectiveness after ten (10) laundry cycles.

As such, a need currently exists for an improved water resistant fabric and protective garment to be worn by fire fighters. More particularly, a need exists for a method of applying a water resistant treatment to a protective garment that will not degrade over a period of time and that can withstand normal laundering.

SUMMARY OF THE INVENTION

The present invention recognizes and addresses the foregoing disadvantages, and others of prior art constructions and methods.

Accordingly, an object of the present invention is to provide an improved protective garment suitable for use by a fire fighter.

It is another object of the present invention is to provide a protective fabric for making garments that has been treated with a durable water resistant treatment.

Still another object of the present invention is to provide a protective fabric having a water resistant treatment that can withstand normal laundering.

It is another object of the present invention to provide a protective garment for fire fighters that contains a durable water resistant treatment applied to an exterior shell that allows the garment to maintain a spray rating of at least 70 even after 30 laundry cycles.

These and other objects of the present invention are achieved by providing a fabric for constructing a protective garment suitable for use by a fire fighter. The protective garment includes an inner lining configured to cover a predetermined portion of a wearer's body. The inner lining is positioned so as to be placed adjacent to the wearer's body during use. An outer shell made from the above fabric covers the inner lining and is made from a fire resistant material.

In accordance with the present invention, a durable water resistant treatment is incorporated into the outer shell. The durable water resistant treatment is affixed to the outer shell such that the outer shell maintains a spray rating of at least 70 even after 30 laundry cycles, and, in some applications, maintains a spray rating of at least 70 even after 50 laundry cycles. In an alternative preferred embodiment of the present invention, the outer shell is constructed so as to maintain a spray rating of at least 80 after 20 laundry cycles.

In one embodiment, the outer shell can be made from a woven fabric, such as having a plain, twill or rip stop weave. The material used to make the outer shell can be an aramid polymer or can be a mixture of an aramid polymer and polybenzimidazole. The woven fabric used to make the outer shell can have a weight of from about 5.5 ounces per square yard to about 8 ounces per square yard, and particularly at a weight of about 7.5 ounces per square yard. Further, a thermal barrier layer can be positioned between the outer shell and the inner lining.

The durable water resistant treatment applied to the outer shell can contain a fluorocarbon polymer. The water resistant treatment can be applied to the outer shell as a solution and then later cured or dried by heating the outer shell fabric.

These and other objects of the present invention are also achieved by providing a process for producing a water resistant fabric particularly well adapted for use as an exterior covering for a fire fighters protective garment. The process includes the steps of providing a fire resistant material. For instance, the fire resistant material can be a woven fabric made from a fire resistant polymer, such as an aramid polymer. In one embodiment, the fire resistant material is scoured, such as by being exposed to an alkaline solution. After scouring, the material is dried.

Once dried, a durable water resistant treatment, such as a fluorocarbon polymer solution, is then applied to at least one side of the fire resistant material. Once the water resistant treatment is applied to the material, the material is heated until the treatment is dried and cured. In particular, according to the present invention, the durable water resistant treatment is affixed to the fire resistant material such that the material maintains a spray rating of at least 70 even after 30 laundry cycles.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
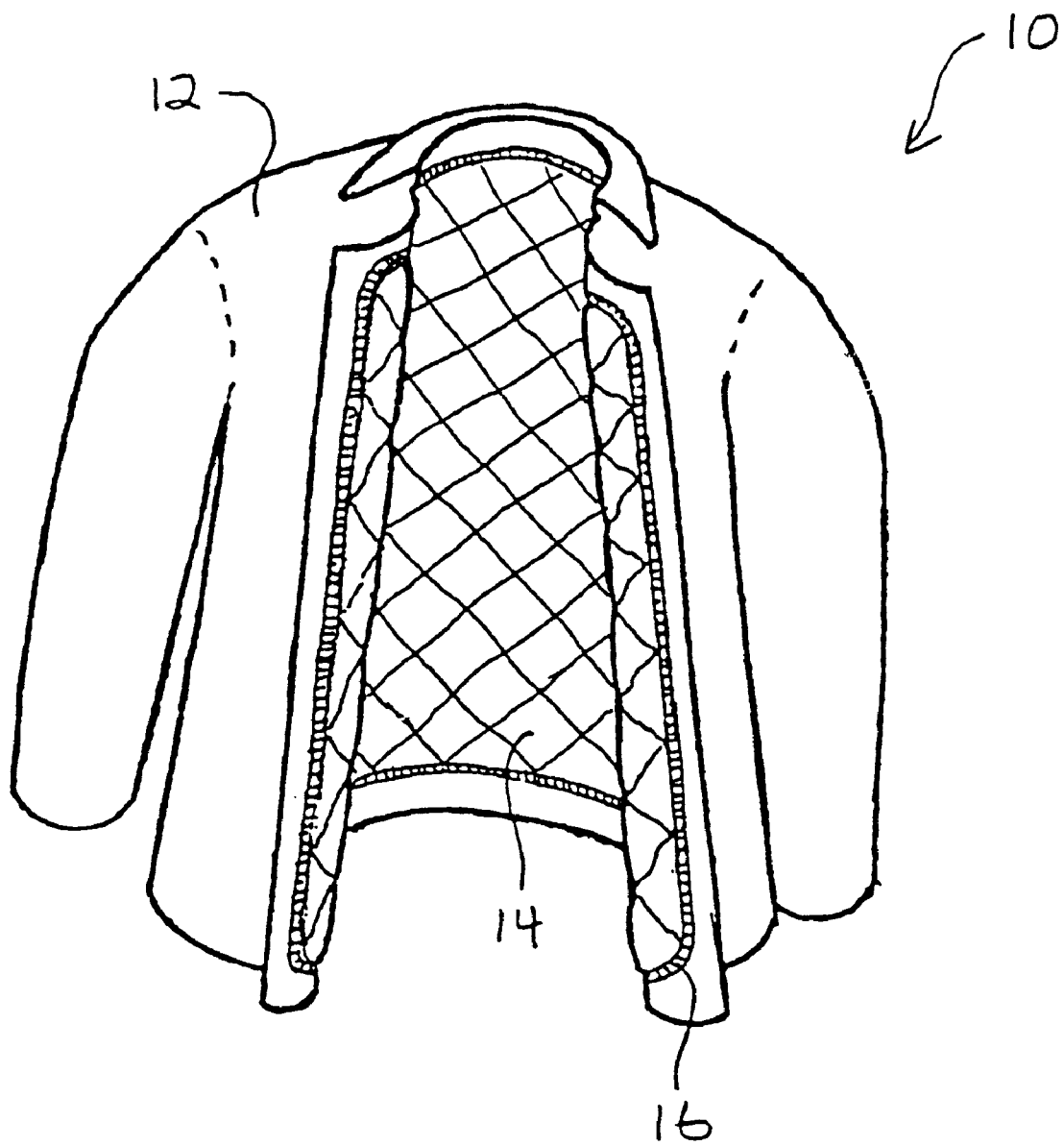
FIG. 1 is a perspective view of one embodiment of a protective garment made according to the present invention.

Repeat use of reference characters in the present specification and drawings is intended to represent same or analogous features or elements of the invention.

Definitions and Standardized Procedures

The following definitions and procedures are offered in order to better describe and quantify the performance of protective garments and fabrics made according to the present invention in comparison to prior art constructions.

Spray Test

As used herein, a fabric spray rating refers to a rating a fabric or a material receives according to AATCC SPRAY TEST METHOD 22-1985. In general, a spray test measures the resistance of a material to wetting by water.

According to the present invention, the following is the procedure used to determine the spray rating of a material.

1. An 8"×8" sample of the material to be tested is first conditioned at 65 plus or minus 2% relative humidity and at 70 plus or minus 2° F. for a minimum of four hours prior to testing.

2. The fabric sample is fastened securely on a 6" metal or plastic hoop so that the fabric is wrinkle free. The hoop is supported on a tester's stand so that the fabric is facing up. Twills, gabardines, piques or similar fabrics of ribbed construction are positioned on the stand so that the ribs are diagonal to the flow of water running off the fabric. A funnel attached to a nozzle for holding water is placed 6" above the center of the fabric.

3. 250 milliliters of water at 80 plus or minus 2° F. are poured from a cup or other container into the funnel, allowing the water to spray onto the fabric.

4. Once the water has run through the funnel, one edge of the hoop is held and the opposite edge is firmly rapped once against a solid object with the fabric facing the object. The hoop is then rotated 180° and it is rapped once more at the point previously held.

5. The wetted or spotted fabric sample is then compared with the standards shown in FIGS. 3A–3F. The fabric is assigned a spray rating that corresponds to the nearest standard. As shown on FIGS. 3A–3F, the fabric can be rated from 0 to 100 wherein 0 indicates that the entire fabric is wetted with the water, while a rating of 100 indicates that none of the fabric was wetted by the water.

Water Repellency Test

The following standardized water repellency test determines a material's resistance to wetting by aqueous liquids. In general, drops of a water-alcohol mixture of varying surface tensions are placed on the surface of the material and the extent of surface wetting is determined visually. The higher the rating a material receives is an indication of the material's resistance to staining by water-based substances. The composition of standard test liquids is as follows:

TABLE 1

| Water Repellency | Standard Test Liquids | |
|---|---|---|
| | Composition | |
| Rating Number | Isopropanol, % | Distilled Water, % |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

The water repellency procedure is as follows:

1. A 2"×8" sample of material is first conditioned at 65 plus or minus 2% relative humidity and at 70 plus or minus 2° F. for a minimum of four hours. The fabric is placed horizontally face up on white blotting paper.

2. Beginning with test liquid number 1, one drop of the liquid is placed at three locations on the material. Each drop placed on the material should be 2" apart.

3. The material is observed for 10 seconds from an approximate 45° angle.

4. If two of the three drops have not wet the fabric or do not show leaking into the fabric, drops of test liquid number 2 are placed on an adjacent site and step number 3 is repeated.

5. This procedure is continued until 2 of the 3 drops have wet or show wicking into the fabric. The water repellency rating is the highest numbered liquid for which 2 of the three drops do not wet or wick into the fabric.

Oil Repellency Test

The following oil repellency test determines how well finished fabrics resist oily stains and wetting by organic liquids. In this test, drops of eight liquid hydrocarbons of various surface tensions are placed on the surface of the material and the extent of surface wetting is determined visually. The standard test liquids used are as follows:

TABLE 2

Oil Repellency Standard Test Liquids

| Hydrocarbon | Rating Number |
| --- | --- |
| Refined Mineral Oil | 1 |
| Refined Mineral Oil/n-Hexadecane 65/35% by volume at 21° C. | 2 |
| n-Hexadecane | 3 |
| n-Tetradecane | 4 |
| n-Dodecane | 5 |
| n-Decane | 6 |
| n-Octane | 7 |
| n-Heptane | 8 |

1. A 2"×8" sample of material is conditioned at 65 plus or minus 2% relative humidity and at 70 plus or minus 2° F. for a minimum of four hours before testing. The fabric is placed in a horizontal position face up on white blotting paper.

2. Beginning with liquid number 1, drops approximately 5 milliliters in diameter or 0.05 microliters in volume are placed on the test sample in several locations.

3. The drops are observed for 30 seconds from an approximate 45° angle. Wetting of the fabric is normally shown by darkening at the liquid/fabric interface. On black or dark fabrics, wetting can be detected by a loss of sparkle within the drop.

4. If liquid number 1 does not penetrate or wet the fabric or show wicking around the drops, drops of liquid number 2 are placed on adjacent portions of the fabric and observed for 30 seconds.

5. This procedure is continued until the fabric shows wetting under or around the drops of test liquid within 30 seconds. A sample's AATCC oil repellency rating is the number of the highest numbered test liquid that will not wet the fabric or show wicking within 30 seconds.

Laundering Test

Laundering is preferably performed in a KENMORE automatic washer, followed by drying in a KENMORE automatic dryer. The following laundering test is used to determine the fabric's ability to withstand laundering. Typically, after laundering, the fabric is then subjected to the above-described spray test, water repellency test, and oil repellency test.

1. 8"×10" test specimens are combined with load fabrics (hemmed pieces of cotton sheeting or 50:50 fabric sheets having a size of 36"×36") to give a total dry load of 4 pounds.

2. The dials on the washer are set as follows:

| | |
| --- | --- |
| Water Level | High |
| Wash Cycle | Normal, 12 minutes |
| Temperature | Warm Wash, 105° F.; Cold Rinse |

The test pieces and dummy load are placed in the washer and the machine is started. One ounce of TIDE (Proctor & Gamble) detergent is added while the washer is filling with soft water. If the water hardness is greater than 5 ppm, CALGON water softener (Nalco) in the amount specified by the manufacturer is added to soften the water.

3. After the washing is complete, the wet fabric including the dummy load is placed in the automatic dryer. The dryer temperature dial is set to the proper point under high heat to give a maximum vent temperature of from about 155° F. to about 160° F. The time dial is set for "Normal Cycle" for 45 minutes. The machine is started and drying is allowed to continue until the cycle is complete. The above represents one laundry cycle.

4. The fabrics are then rewashed and redried until 10 cycles have been completed. Optionally, the test fabrics can be pressed with a hand iron, or the equivalent, at 280° F. to about 320° F. for 30 seconds on each side with the face side pressed last. The fabrics are then conditioned before testing for water repellency, oil repellency, or spray rating. As used herein, water repellency, oil repellency and spray ratings are all determined without ironing the fabric after being laundered, unless otherwise denoted.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a fabric and a protective garment for fire fighters that has improved water resistant properties. In particular, the present invention is directed to a fire fighters garment having an outer shell fabric that has been treated with a durable water resistant composition. The water resistant treatment prevents water and moisture from being absorbed by the garment. In comparison to prior art constructions, the water resistant treatment as applied according to the process of the present invention is much more durable in that the treatment will not significantly degrade or wear off the garment when exposed to normal wear and tear. In particular, it has been discovered that water resistant treatments applied according to the present invention can withstand at least 30 laundry cycles as defined above without losing a substantial amount of effectiveness.

Referring to FIG. 1, one embodiment of an improved protective garment generally 10 constructed in accordance with the present invention is illustrated. Garment 10 includes a relatively tough outer shell 12 having a liner assembly 14 located therein. Outer shell 12 and liner assembly 14 together function to protect a wearer from heat and flame such as may be encountered during fire fighting activities.

In the illustrated embodiment, liner assembly 14 is constructed as a separate unit that may be removed from outer shell 12. A zipper 16 is provided for removably securing liner assembly 14 to outer shell 12. It should be appreciated, however, that other suitable means of attachment, including a more permanent type of attachment such as stitches, may also be used between liner assembly 14 and outer shell 12.

Figure 2:
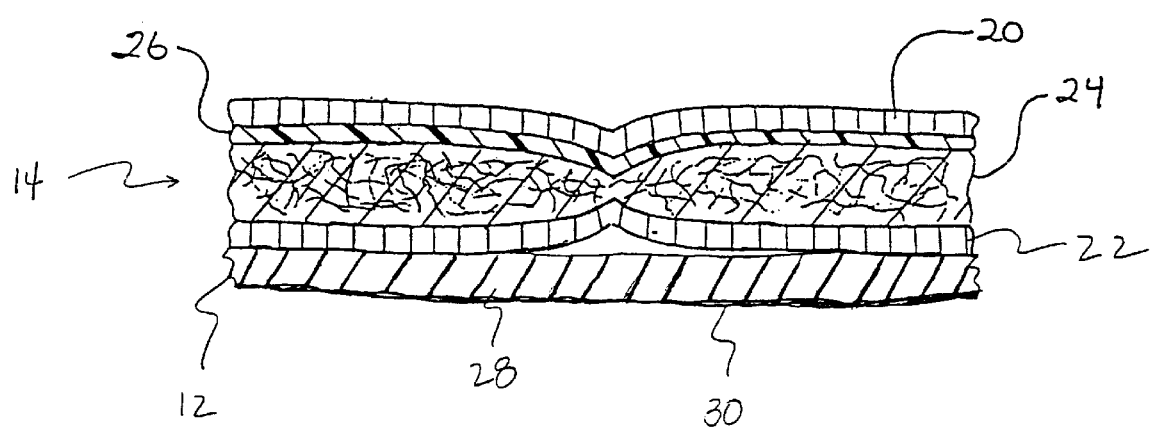
FIG. 2 is a cross-sectional view of the garment illustrated in FIG. 1.
Figure 3A:
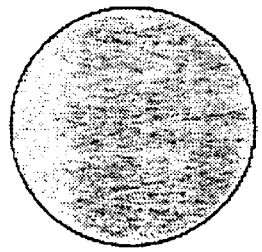
FIGS. 3A–3F are diagrammatical views of illustrative examples of spray ratings for a standardized fabric spray test.
Figure 3B:
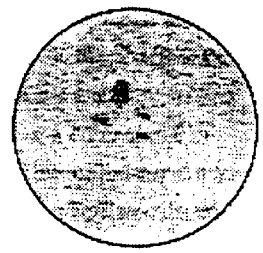
Figure 3C:
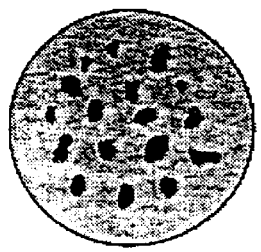
Figure 3D:
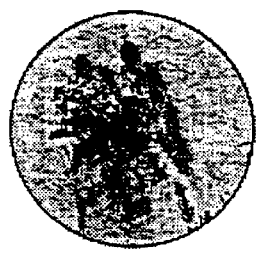
Figure 3E:
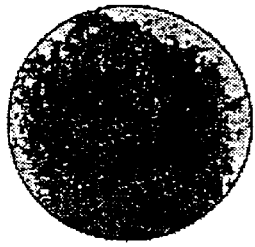
Figure 3F:
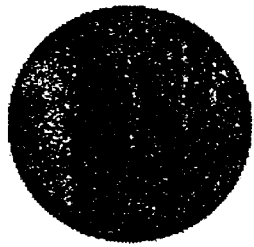

The construction of protective garment 10 is more particularly illustrated in FIG. 2. As shown, liner assembly 14 includes a plurality of material layers quilted together. The outermost layers, i.e. lining layers 20 and 22, are connected together about their respective peripheries to form an inner cavity. A thermal barrier layer 24 and a moisture barrier layer 26 are located within the inner cavity, as shown. Typically, lining layer 20 will be adjacent the wearers body during use, whereas lining layer 22 will be adjacent outer shell 12.

Thermal barrier layer 24 can be made from various materials. For instance, an aramid felt, such as a felt produced from NOMEX fibers obtained from DuPont can be used. The felt functions as an insulator to inhibit transfer of heat from the ambient environment to the wearer.

Moisture barrier 26 is preferably a suitable polymeric membrane that is impermeable to liquid water but is permeable to water vapor. Moisture barrier layer 26 is designed to prevent water contacting the exterior surface of garment 10 from reaching the wearer while at the same time permitting the escape of perspiration from the wearer.

Outer shell 12, which can be positioned loosely adjacent to liner assembly 14, includes a woven fabric 28 treated with a durable water resistant composition 30 in accordance with the present invention. In general, woven fabric 28 should be made from a mechanical resistant, flame resistant, and thermal resistant material. For instance, woven fabric 28 can be made from aromatic polyamide polymers, such as aramid fibers. For example, KEVLAR para-aramid fibers, NOMEX meta-aramid fibers, and mixtures of KEVLAR fibers and NOMEX fibers commercially available from DuPont are particularly well suited for use in constructing woven fabric 28. Besides KEVLAR fibers and NOMEX fibers, other fibers that may be used to produce the woven fabric include melamine fibers, such as BASOFIL fibers commercially available from BASF, or P-84 aramid fibers also available from Lenzing. It should be understood, however, that any suitable fire resistant fiber may be used to construct the fabric of the present invention.

In one embodiment, the yarns used to make woven fabric 28 can be made from a mixture of aramid polymer fibers, such as KEVLAR or NOMEX fibers, and polybenzimidazole (PBI) fibers. In one preferred embodiment of the present invention, woven fabric 28 is made from a 60/40 blend of KEVLAR para-aramid fibers and PBI fibers.

The yarns used to produce woven fabric 28 can be assembled in various different constructions and is generally not critical. For instance, woven fabric 28 can have a twill weave, a plain weave or any other suitable type of weave. In one preferred embodiment, woven fabric 28 has a rip stop weave. In general, fabrics having a tighter weave will generally have better spray ratings.

The weight of woven fabric 28 generally can vary from about 5.5 ounces per square yard to about 8 ounces per square yard. Preferably, the weight of woven fabric is from about 6 ounces per square yard to about 7.5 ounces per square yard.

In accordance with the present invention, as shown in FIG. 2, woven fabric 28 is treated with a durable water resistant composition 30. When applied according to the process of the present invention, it has been discovered that water resistant treatment 30 is much more durable than many prior art constructions. Thus, garments made according to the present invention can be routinely laundered and used for an extended period of time without losing their ability to repel water. As described above, should a protective garment absorb water, the garment becomes much heavier and the thermal properties of the garment become adversely affected.

Besides making protective garment 10 impermeable to water, durable water resistant treatment 30 is also preferably resistant to oil and organic solvents, is not flammable, and is abrasion resistant. In one preferred embodiment of the present invention, durable water resistant treatment 30 is made from a solution containing a fluorocarbon polymer that is applied to woven fabric 28. For example, durable water resistant composition 30 can be made from TEFLON polymers which are commercially available from DuPont. Fluorocarbon polymer solutions containing TEFLON polymers are commercially available from numerous sources.

In order to produce a liquid resistant fabric in accordance with the present invention, first, a woven fabric is constructed or obtained that is suitable for use as an outer shell material in a protective garment for fire fighters. As described above, the fabric should be made from flame resistant polymers or other suitable materials.

Prior to applying a durable water resistant treatment, the fabric can be first scoured, although scouring may not be necessary for all applications. When scoured, the material can be scoured with an alkaline solution.

After being scoured, the fabric is then put on a tenter frame, dried and heat set. Specifically, it has been discovered by the present inventors that it is important that the fabric be substantially dry and free of moisture prior to being treated with the durable water resistant composition. For instance, after scouring, the fabric should be dried so that the moisture level is substantially equivalent to the natural moisture level of the fibers used to make the fabric. For instance, for most fibers, the moisture level should be less than about 10%, and particularly less than about 7%.

After the fabric has been dried and heat set, a durable water resistant composition according to the present invention is applied to at least one side of the fabric. Although the composition can be sprayed on the fabric or printed on the fabric, preferably the fabric is dipped into a bath containing the durable water resistant treatment in solution form.

As stated above, the durable water resistant composition, in one embodiment, can be a solution containing a fluorocarbon polymer. The fluorocarbon polymer can be combined in the solution with water, a drying agent such as an alcohol, and an emulsifier. The amount of the water-resistant composition applied to the fabric will depend upon the particular formulation and the particular application.

After the durable water resistant treatment is applied to the fabric, the fabric is then heated to a temperature sufficient for the coating to dry and/or cure. Once the durable water resistant treatment is cured and affixed to the woven fabric, the fabric can then be used in constructing protective garments in accordance with the present invention.

It has been discovered that the above-described process securely affixes the water resistant treatment to the fabric such that the treatment becomes much more durable than prior art constructions.

By applying water resistant treatments according to the process of the present invention, it has been discovered that the treatments can withstand numerous laundry cycles. For example, in one embodiment, the outer garment of the present invention has shown to exhibit a spray rating of at least 80 after 20 laundry cycles. More particularly, even after 30 laundry cycles it has been discovered that fabrics made according to the present invention have a spray rating of at least 70 and in some applications at least 80, illustrating that the water resistant treatment does not degrade and does not lose its effectiveness. Further, after undergoing thirty (30) laundry cycles, fabrics made according to the present invention have also been found to retain a water repellency rating of at least 4 and an oil repellency rating of at least 3.

The present invention may be better understood with reference to the following examples.

EXAMPLE NO. 1

The following tests were performed in order to demonstrate the superiority in performance of fabrics made according to the present invention in comparison to conventionally made fabrics.

A woven fabric suitable for use as an outer shell material for a fire fighter's protective garment was coated with a durable water resistant composition according to the above-described process of the present invention. Specifically, the fabric that was treated had the following characteristics and properties:

| Material: | 60%/40% intimate blend of KEVLAR aramid polymer fibers and PBI fibers |
|---|---|
| Denier: | 1.5 |
| Count: | 44 yarns/inch |
| Pick: | 39 yarns/inch |
| Weave: | Rip stop |
| Weight: | 7.5 oz/sq. yard |

After the above material was scoured, dried and heat set, a durable water resistant composition was applied to the fabric. The durable water resistant composition was an aqueous solution containing a fluorocarbon polymer, an emulsifier, and an alcohol.

The above-treated fabric was then tested for water repellency, oil repellency, and spray tested initially and after 10, 20, 30, 40 and 50 laundry cycles. All the tests were conducted according to the above-described procedures. The sample was tested both before and after being pressed with a hand held iron. The following results were obtained:

TABLE 3

Water Repellency, Oil Repellency and Spray Test Results of the Fabric Made According to the Present Invention

| | Before Pressing | | | After Pressing | | |
|---|---|---|---|---|---|---|
| Launderings | Water | Oil | Spray | Water | Oil | Spray |
| Initial | 6 | 5 | 100 | — | — | — |
| 10 | 6 | 5 | 80 | 6 | 5 | 80 |
| 20 | 6 | 5 | 70 | 6 | 5 | 80 |
| 30 | 4–5 | 3–4 | 70 | 6 | 4 | 70–80 |
| 40 | 4–5 | 3–4 | 70 | 6 | 4 | 70–80 |
| 50 | 4–5 | 3–4 | 70 | 6 | 4 | 70 |

Commercially available fabrics designed to be used as outer shell materials for protective garments were also similarly tested after 10 and 30 laundry cycles. Of particular importance, the commercial fabrics tested had similar weave characteristics to the above-described fabric. Specifically, one of the products tested was NATURAL PBI obtained from Southern Mills and the other fabric tested was PBI SOFT HAND obtained from Dominion Industrial Textiles. The following results were obtained:

TABLE 4

Water Repellency, Oil Repellency, and Spray Test Results of NATURAL PBI Fabric Obtained from Southern Mills

| | Before Pressing | | | After Pressing | | |
|---|---|---|---|---|---|---|
| Launderings | Water | Oil | Spray | Water | Oil | Spray |
| Initial | 6 | 5 | 100 | — | — | — |
| 10 | 3 | 0 | 50 | 4 | 0 | 50 |
| 30 | 2 | 0 | 0 | 2 | 0 | 50 |

TABLE 5

Water Repellency, Oil Repellency, and Spray Test Results of PBI SOFT HAND Fabric Obtained from Dominion Industrial Textiles

| | Before Pressing | | | After Pressing | | |
|---|---|---|---|---|---|---|
| Launderings | Water | Oil | Spray | Water | Oil | Spray |
| Initial | 6 | 5 | 100 | — | — | — |
| 10 | 1–2 | 0 | 50 | 3 | 0 | 50 |
| 30 | 0 | 0 | 0 | 0 | 0 | 0 |

As shown above, the current commercially available fabrics lost half of their water resistancy only after 10 laundry cycles. After 30 laundry cycles, the fabrics completely lost their water repellency.

In comparison, the fabric made according to the present invention maintained a spray rating of at least 70 after 30 laundry cycles and even after 50 laundry cycles. As shown above, the fabric made according to the process of the present invention also had much better water repellency ratings and oil repellency ratings after being laundered. It is not believed that prior to the present invention an outer shell material was made that contained a water resistant treatment that could maintain a spray rating of at least 70 after 30 laundry cycles.

EXAMPLE NO. 2

A woven fabric similar to the one described in Example No. 1 above was coated with a water resistant composition as described in Example 1. In this example, however, the composition applied to the fabric did not contain an emulsifier but contained more fluorocarbon polymer.

The treated fabric was tested for water repellency, oil repellency and spray tested initially and after 10, 20 and 30 laundry cycles. All the tests were conduced according to the procedures described above. A sample was tested both before and after being pressed with a hand held iron. The following results were obtained:

TABLE 6

Water Repellency, Oil Repellency and Spray Test Results of a Fabric Made According to the Present Invention

| | Before Pressing | | | After Pressing | | |
|---|---|---|---|---|---|---|
| Launderings | water | oil | spray | water | oil | spray |
| Initial | 6 | 6 | 100 | — | — | — |
| 10 | 6 | 5 | 90 | 6 | 5 | 100 |
| 20 | 6 | 5 | 80–90 | 6 | 6 | 100 |
| 30 | 5–6 | 4–5 | 80 | 6 | 5 | 100 |

As shown above, the treated fabric produced according to this example performed exceptionally well. In particular, the fabric had a spray rating of at least 80 after 20 laundry cycles, and a spray rating of 80 even after 30 laundry cycles. Further, the fabric was found well suited to repelling water and oil, having a water repellency rating of at least 5 and an oil repellency rating of at least 4 after 30 laundry cycles. Even better results were obtained after pressing.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A protective garment suitable for use by a fire fighter, said protective garment comprising:
   an inner lining configured to cover a predetermined portion of a wearer's body, said inner lining being positioned so as to be adjacent said wearer's body during use; and
   an outer shell covering said inner lining, said outer shell being made from a fire resistant material, said outer shell being impregnated with a durable water resistant treatment, said durable water resistant treatment being incorporated into said outer shell such that said outer shell maintains a spray rating of at least 70 after being laundered 30 laundry cycles and then pressed.

2. A protective garment as defined in claim 1, wherein said durable water resistant treatment comprises a fluorocarbon polymer.

3. A protective garment as defined in claim 1, wherein said outer shell maintains a spray rating of at least 70 after 30 laundry cycles without being pressed.

4. A protective garment as defined in claim 1, wherein said durable water resistant treatment is incorporated into said outer shell such that said outer shell maintains a spray rating of at least 80 after 30 laundry cycles without being pressed.

5. A protective garment as defined in claim 1, wherein said outer shell is a woven fabric comprising polybenzimidazole and an aromatic polyamide polymer.

6. A protective garment as defined in claim 1, wherein said outer shell is made from an aramid polymer.

7. A protective garment as defined in claim 1, wherein said outer shell also maintains a water repellency rating of at least 4 and an oil repellency rating of at least 3 after 30 laundry cycles.

8. A protective garment as defined in claim 1, wherein said outer shell weighs from about 6 ounces per square yard to about 10 ounces per square yard.

9. A protective garment as defined in claim 1, further comprising a thermal barrier layer positioned between said inner lining and said outer shell.

10. A protective garment suitable for use by a fire fighter, said protective garment comprising:
    an inner lining configured to cover a predetermined portion of a wearer's body, said inner lining being positioned so as to be adjacent said wearer's body during use;
    an outer shell covering said inner lining, said outer shell comprising a woven fabric made from fire resistant yarns;
    a thermal barrier layer positioned between said inner lining and said outer shell; and
    a durable water resistant treatment impregnated into said outer shell, said durable water resistant treatment comprising a fluorocarbon polymer, said durable water resistant treatment being incorporated into said outer shell such that said outer shell maintains a spray rating of at least 70 after 30 laundry cycles.

11. A protective garment as defined in claim 10, wherein said durable water resistant treatment is incorporated into said outer shell such that said outer shell maintains a spray rating of at least 80 after 30 laundry cycles.

12. A protective garment as defined in claim 10, wherein said durable water resistant treatment is incorporated into said outer shell such that said outer shell maintains a water repellency rating of at least 4 and an oil repellency rating of at least 3 after 30 laundry cycles.

13. A water and fire resistant fabric particularly well suited for producing protective garments for use by a fire fighter, said water and fire resistant fabric comprising:
    a woven fabric substrate, said woven fabric substrate being made from a fire resistant material; and
    a durable water resistant treatment impregnated into said fabric substrate, said durable water resistant treatment being incorporated into said fabric substrate such that said fabric substrate maintains a spray rating of at least 70 after 30 laundry cycles.

14. A water and fire resistant fabric as defined in claim 13, wherein said durable water resistant treatment comprises a fluorocarbon polymer.

15. A water and fire resistant fabric as defined in claim 13, wherein said fire resistant material is made from a polymeric material comprising an aramid polymer.

16. A water and fire resistant fabric as defined in claim 15, wherein said polymeric material used to make said fire resistant material further comprises polybenzimidazole.

17. A water and fire resistant fabric as defined in claim 13, wherein said fabric substrate also maintains a water repellency rating of at least 4 and an oil repellency of at least 3 after 30 laundry cycles.

18. A process for producing a water resistant fabric particularly adapted for use as an exterior covering for a fire fighters protective garment, said process comprising the steps of:
    providing a fire resistant material, said fire resistant material comprising a woven fabric, said fire resistant material being substantially free of moisture;
    applying a durable water resistant treatment to said fire resistant material; and
    thereafter heating said fire resistant material so as to affix said durable water resistant treatment to said fire resistant material, said durable water resistant treatment being affixed to said fire resistant material such that said fire resistant material maintains a spray rating of at least 70 after 30 laundry cycles.

19. A process as defined in claim 18, wherein said fire resistant material is made from yarns comprised of an aramid polymer.

20. A process as defined in claim 18, wherein said fire resistant material is made from yarns comprising a mixture of aramid polymer fibers and polybenzimidazole fibers.

21. A process as defined in claim 18, wherein said durable water resistant treatment comprises a fluorocarbon polymer.

22. A process as defined in claim 18, further comprising the steps of:
    scouring said fire resistant material prior to applying said durable water resistant treatment; and
    drying said scoured fire resistant material such that said fire resistant material is substantially free of moisture.

23. A process as defined in claim 18, wherein said durable water resistant treatment is affixed to said fire resistant material so that said fire resistant material also maintains a water repellency rating of at least 4 and an oil repellency rating of at least 3 after 30 laundry cycles.

24. A process as defined in claim 18, wherein said durable water resistant treatment that is applied to said fire resistant material comprises an aqueous solution containing a fluorocarbon polymer and an alcohol.

25. A protective garment suitable for use by a firefighter, said protective garment comprising:

an inner lining configured to cover a predetermined portion of the wearer's body, said inner lining being positioned so as to be adjacent said wearer's body during use; and an outer shell covering said inner lining, said outer shell being made from a fire resistant material, said outer shell being impregnated with a durable water resistant treatment, said durable water resistant treatment being incorporated into said outer shell such that said outer shell maintains a spray rating of at least 80 after 20 laundry cycles.

26. A protective garment as defined in claim 25, wherein said durable water resistant treatment comprises a fluorocarbon polymer and wherein said outer shell comprises a woven fabric.

27. A protective garment as defined in claim 25, wherein said outer shell further maintains a spray rating of at least 70 after 30 laundry cycles.

* * * * *

UNITED STATES PATENT AND TRADEMARK OFFICE
CERTIFICATE OF CORRECTION

PATENT NO : 6,065,153
DATED : May 23, 2000
INVENTOR(S): Joey K. Underwood and T. Doyle Kelley It is certified that error appears in the above-identified patent and that said Letters Patent is hereby corrected as shown below:

On the title page insert the following:

Item [73] Assignee:
    Safety Components Fabric Technologies, Inc.
    Greenville, South Carolina Signed and Sealed this Twenty-sixth Day of December, 2000

Attest:

Q. TODD DICKINSON

*Attesting Officer*    *Director of Patents and Trademarks*